(12) United States Patent
Miller et al.

(10) Patent No.: US 10,534,602 B2
(45) Date of Patent: Jan. 14, 2020

(54) PREFERENCE LEARNING FOR ADAPTIVE OTA NOTIFICATIONS

(71) Applicant: FORD GLOBAL TECHNOLOGIES, LLC, Dearborn, MI (US)

(72) Inventors: Jason Michael Miller, Woodhaven, MI (US); Sangeetha Sangameswaran, Canton, MI (US); Fling Tseng, Ann Arbor, MI (US); Daniel Joseph Madrid, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 15/918,337

(22) Filed: Mar. 12, 2018

(65) Prior Publication Data

US 2019/0278581 A1 Sep. 12, 2019

(51) Int. Cl.
 *G06F 8/65* (2018.01)
(52) U.S. Cl.
 CPC ...................... *G06F 8/65* (2013.01)
(58) Field of Classification Search
 CPC .......................................................... G06F 8/65
 USPC .................................................. 717/168–173
 See application file for complete search history.

(56) References Cited

U.S. PATENT DOCUMENTS

| | | | |
|---|---|---|---|
| 9,097,549 B1* | 8/2015 | Rao ..................... | G01C 21/3461 |
| 9,104,537 B1 | 8/2015 | Penilla et al. | |
| 9,715,378 B2 | 7/2017 | Dickerson et al. | |
| 2006/0080656 A1* | 4/2006 | Cain ......................... | G06F 8/65 717/174 |
| 2008/0076387 A1* | 3/2008 | Levenson ............ | G08B 25/006 455/411 |
| 2009/0288076 A1* | 11/2009 | Johnson .................... | G06F 8/65 717/168 |
| 2014/0109075 A1* | 4/2014 | Hoffman ................... | G06F 8/65 717/169 |
| 2015/0169311 A1* | 6/2015 | Dickerson ................ | G06F 8/65 717/170 |
| 2015/0254719 A1* | 9/2015 | Barfield, Jr. ........ | G06Q 30/0265 705/14.53 |
| 2016/0070527 A1* | 3/2016 | Ricci ....................... | G06F 3/165 715/716 |
| 2016/0086391 A1* | 3/2016 | Ricci ...................... | G07C 5/008 701/29.3 |
| 2016/0364224 A1* | 12/2016 | Tuukkanen ............... | G06F 8/65 |
| 2017/0197617 A1* | 7/2017 | Penilla .................. | B60W 30/09 |
| 2017/0316697 A1* | 11/2017 | Tulabandhula ......... | G08G 1/123 |
| 2017/0357499 A1* | 12/2017 | Hong ....................... | G06F 8/65 |
| 2018/0058875 A1* | 3/2018 | Wan .................... | G01C 21/3484 |
| 2018/0059687 A1* | 3/2018 | Hayes ................ | G01C 21/3415 |

* cited by examiner

*Primary Examiner* — Qing Chen
(74) *Attorney, Agent, or Firm* — Michael J. Spenner; Brooks Kushman P.C.

(57) ABSTRACT

A vehicle includes a controller and a processor. The processor is programmed to prompt the user with a selection to install a software update to the controller responsive to a user preference value, computed from user selections whether or not to install software updates associated with contextual information that matches a software update to be installed, exceeding a threshold defined by a priority of the software update, and update the user preference value per the selection.

20 Claims, 3 Drawing Sheets

PREFERENCE LEARNING FOR ADAPTIVE OTA NOTIFICATIONS

TECHNICAL FIELD

The present disclosure generally relates to over-the-air (OTA) software updates. More specifically, the present disclosure relates to preference learning for adaptive OTA notifications.

BACKGROUND

Modern vehicles include components operated by controllers that execute software. From time to time, the software may require to be updated. OTA software updating has become increasingly popular for the convenience it provides. In an OTA system, vehicles are instructed to download the new software wirelessly "over the air" from a server. The new software is then installed to the controllers.

SUMMARY

In one or more example embodiments, a vehicle includes a controller and a processor. The processor is programmed to prompt for a selection to install a software update to the controller responsive to a user preference value exceeding a threshold defined by a priority of the software update, the user preference value being computed from historical selections whether to install software updates that correspond to contextual information that matches a software update to be installed, and update the user preference value per the selection.

In one or more example embodiments, a method includes receiving a trained user preference value from a server per contextual information indicating time, day, and location of a vehicle; prompting for a response to install a software update to the vehicle responsive to the user preference value exceeding a threshold defined by a priority of the software update; installing the update when the response affirms installation; and sending the response to the server to further train the user preference value.

In one or more example embodiments, a system includes a memory storing a plurality of user preference values and a processor. The processor is programmed to send, to a vehicle, a user preference value matching contextual information received in a request from the vehicle, the vehicle using the user preference value to determine whether to prompt the user to install a software update; receive a selection from the vehicle in response to the prompt; and update the user preference value according to the selection.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

OTA updates may be performed to upgrade existing software systems or settings. In some instances, OTA updates may provide additional functionality to the vehicle. The varying level and complexity of software updates result in different levels of potential inconvenience to a user attempting to use a vehicle requiring updates. In addition, a tendency of a particular user to accept or reject a prompt of an OTA may differ due to various factors such as his/her overall tendency for accepting changes, current circumstances (e.g., current and upcoming schedules for the user), or user preference to perform OTA in a delayed manner or at certain locations.

Critically-important updates should be performed when it is safe to do so. However, for less critical updates an adaptive learning approach may be used to identify when and whether to prompt a user to perform updates. The adaptive learning approach may utilize a machine learning system trained by observing historically how users decide to accept or reject less critical updates over time. By combining the historical behavior with context for the user selection (e.g., location, day, time, and average delay of acceptance, etc.), the system may identify stable decision patterns that may be used to prompt the user such that the level and frequency of intrusiveness may match the pattern to result in improved acceptance rate of prompts requesting the update of vehicle software.

Figure 1:
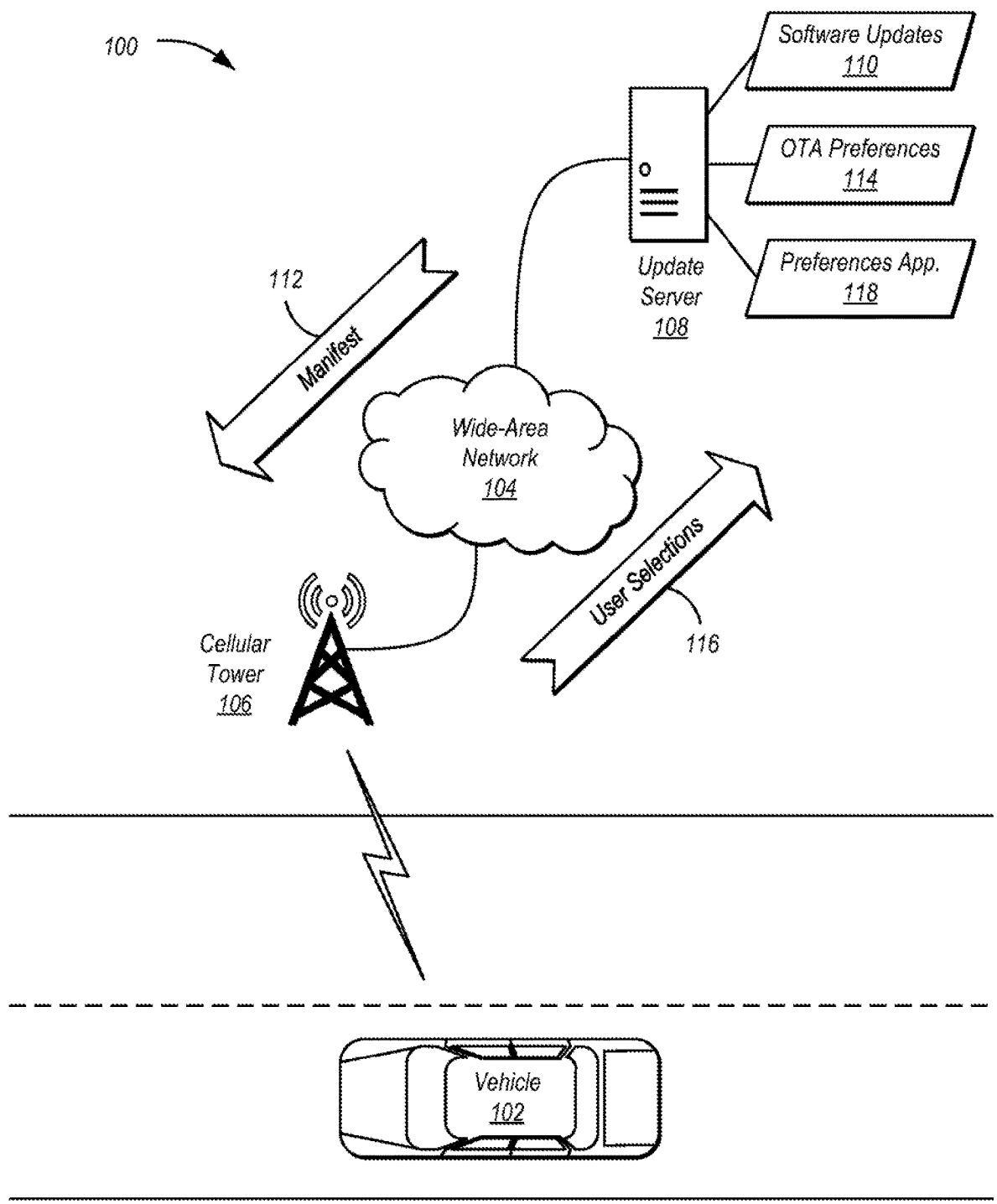
FIG. 1 illustrates an example system for installing software updates to a vehicle by making use of user preferences.

FIG. 1 illustrates an example system 100 for installing software updates 110 to a vehicle 102 by making use of user preferences. As shown, the system 100 includes a vehicle 102 in communication with an update server 108 over a wide-area network 104. The vehicle 102 is configured to wirelessly communicate with cellular towers 106 connected to the wide-area network 104. The server 108 is also in communication with the wide-area network 104. While an example system 100 is shown in FIG. 1, the example components as illustrated are not intended to be limiting. Indeed, the system 100 may have more or fewer components, and additional or alternative components and/or implementations may be used. As an example, the system 100 may include more or fewer vehicles 102, cellular towers 106, and/or update servers 108.

The vehicles 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. Further aspects of the functionality of the vehicle 102 are discussed in detail with respect to FIG. 2.

The wide-area network 104 may include one or more interconnected communication networks such as the Internet, a cable television distribution network, a satellite link network, a local area network, a wide area network, and a telephone network, as some non-limiting examples. By accessing the wide-area network 104, the vehicle 102 may be able to send outgoing data from the vehicle 102 to network destinations on the wide-area network 104, and receive incoming data to the vehicle 102 from network destinations on the wide-area network 104.

The cellular towers 106 may include system hardware configured to allow cellular transceivers of the vehicles 102 to access the communications services of the wide-area network 104. In an example, the cellular towers 106 may be part of a Global System for Mobile communication (GSM) cellular service provider. In another example, the cellular towers 106 may be a part of a code division multiple access (CDMA) cellular service provider. The cellular towers 106 may support various different technologies and data speeds.

The update server 108 may include computing hardware configured to provide data services related to providing software updates 110 to the vehicles 102. The software updates 110 may include updates to firmware, software, and/or settings of the vehicle 102. Further aspects of the functionality of the update server 108 are discussed in detail with respect to FIG. 3.

A manifest 112 may be a file or set of files that specify network locations at which software updates 110 for the vehicle 102 are to be retrieved. As one example, the manifest 112 may specify the network locations as universal resource locators (URLs) served by the update server 108. In some cases, the software updates 110 may include new settings or new versions of files to be installed, while in other cases, the software updates 110 may include incremental updates to be applied to currently installed binaries or settings to update the currently installed binaries or settings from one version to an updated version.

In some examples, the manifest 112 may further include priorities of the updates. In an example, each software update 110 in the manifest 112 may be categorized as one of a plurality of update importance levels. In one example, these importance levels may include, low importance, medium importance, or high importance. In another example, the importance levels may be specified numerically within a range, e.g., from 1 to 10, with 10 being the highest and 1 being the lowest.

The update server 108 may also store OTA preferences 114. The OTA preferences 114 include information indicative of historical user preferences with regard to installation of software updates 110 specified by the manifest 112. In an example, the OTA preferences 114 may include tendencies for users to choose to install software updates 110 at various locations at various times of day or day of week.

A preferences application 118 may be an example of an application installed to the update server 108. When executed by the update server 108, the preferences application 118 may be configured to receive information indicative of user selections 116 whether or not to install software updates 110 to a vehicle 102. The user selections 116 may further include contextual information regarding the user selections 116, such as location, day, and time of the selection. Utilizing the user selections 116, the preferences application 118 may update the OTA preferences 114 to better indicate when a user should be prompted to perform software updates 110.

Figure 2:
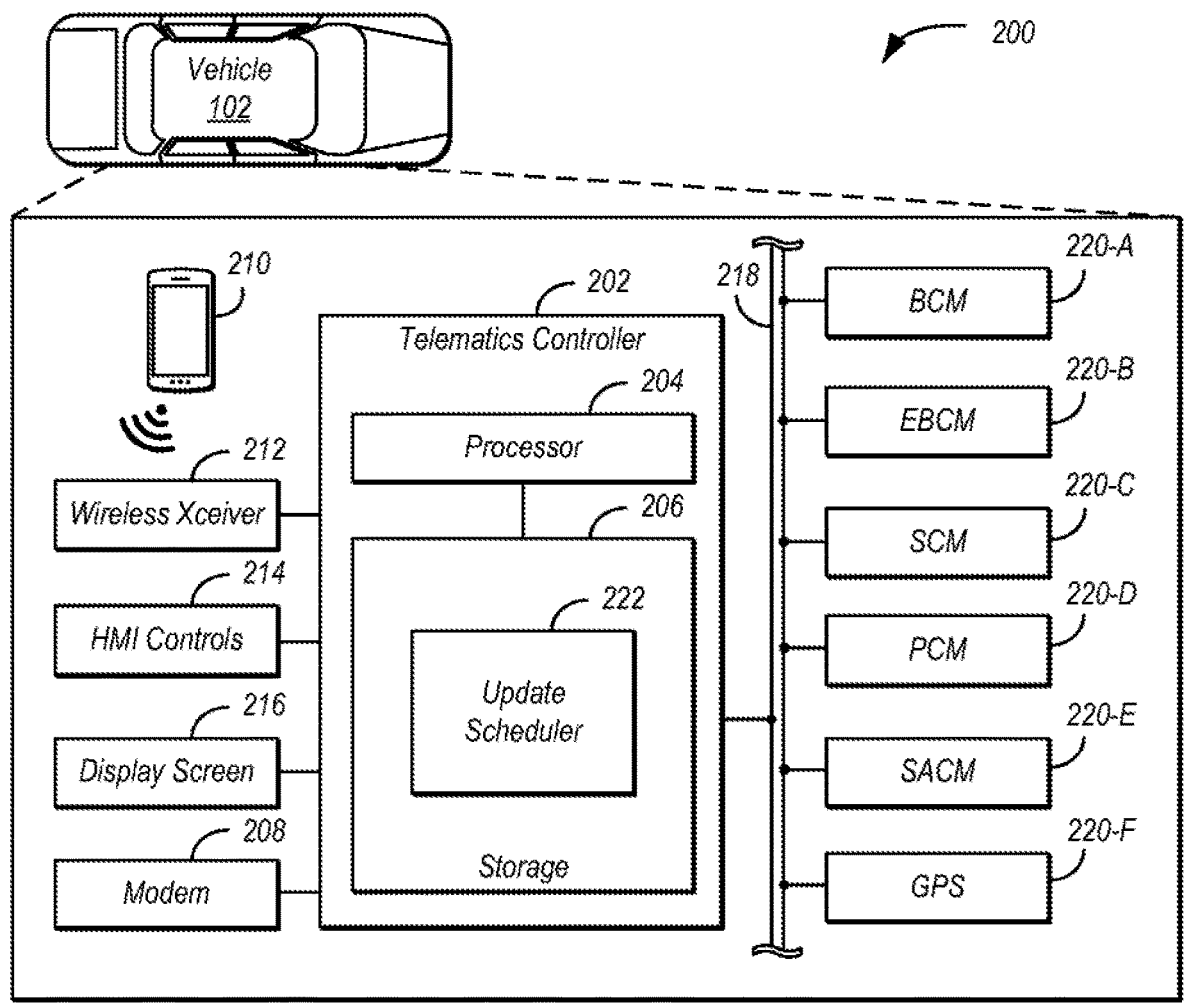
FIG. 2 illustrates an example diagram of the vehicle implementing communications features for use in installing software updates.

FIG. 2 illustrates an example diagram 200 of the vehicle 102 implementing communications features for use in installing software updates 110. The vehicle 102 includes a telematics controller 202 configured to communicate over the wide-area network 104. This communication may be performed using a modem 208 of the telematics controller 202. While an example vehicle 102 is shown in FIG. 2, the example components as illustrated are not intended to be limiting. Indeed, the vehicle 102 may have more or fewer components, and additional or alternative components and/or implementations may be used.

The telematics controller 202 may be configured to support voice command and BLUETOOTH interfaces with the driver and driver carry-on devices (e.g., mobile devices 210), receive user input via various buttons or other controls, and provide vehicle status information to a driver or other vehicle 102 occupants. An example telematics controller 202 may be the SYNC system provided by FORD MOTOR COMPANY of Dearborn, Mich.

The telematics controller 202 may further include various types of computing apparatus in support of performance of the functions of the telematics controller 202 described herein. In an example, the telematics controller 202 may include one or more processors 204 configured to execute computer instructions, and a storage 206 medium on which the computer-executable instructions and/or data may be maintained. A computer-readable storage medium (also referred to as a processor-readable medium or storage 206) includes any non-transitory (e.g., tangible) medium that participates in providing data (e.g., instructions) that may be read by a computer (e.g., by the processor(s) 204). In general, a processor 204 receives instructions and/or data, e.g., from the storage 206, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVASCRIPT, PERL, PL/SQL, etc.

The telematics controller 202 may be configured to communicate with mobile devices 210 of the vehicle occupants. The mobile devices 210 may be any of various types of portable computing device, such as cellular phones, tablet computers, smart watches, laptop computers, portable music players, or other devices capable of communication with the telematics controller 202. As with the telematics controller 202, the mobile device 210 may include one or more processors configured to execute computer instructions, and a storage medium on which the computer-executable instructions and/or data may be maintained. In many examples, the telematics controller 202 may include a wireless transceiver 212 (e.g., a BLUETOOTH controller, a ZIGBEE transceiver, a Wi-Fi transceiver, etc.) configured to communicate with a compatible wireless transceiver of the mobile device 210. Additionally, or alternately, the telematics controller 202 may communicate with the mobile device 210 over a wired connection, such as via a USB connection between the mobile device 210 and a USB subsystem of the telematics controller 202.

The telematics controller 202 may also receive input from human-machine interface (HMI) controls 214 configured to provide for occupant interaction with the vehicle 102. For instance, the telematics controller 202 may interface with one or more buttons or other HMI controls 214 configured to invoke functions on the telematics controller 202 (e.g., steering wheel audio buttons, a push-to-talk button, instrument panel controls, etc.). The telematics controller 202 may also drive or otherwise communicate with one or more displays 216 configured to provide visual output to vehicle occupants, e.g., by way of a video controller. In some cases, the display 216 may be a touch screen further configured to receive user touch input via the video controller, while in other cases the display 216 may be a display only, without touch input capabilities. In an example, the display 216 may be a head unit display included in a center console area of the vehicle 102 cabin. In another example, the display 216 may be a screen of a gauge cluster of the vehicle 102.

The telematics controller 202 may be further configured to communicate with other components of the vehicle 102 via one or more in-vehicle networks 218. The in-vehicle networks 218 may include one or more of a vehicle controller area network (CAN), an Ethernet network, or a media oriented system transfer (MOST), as some examples. The in-vehicle networks 218 may allow the telematics controller 202 to communicate with other vehicle 102 systems, such as a body controller (BCM) 220-A, an electronic brake control system (EBCM) 220-B, a steering control system (SCM) 220-C, a powertrain control system (PCM) 220-D, a safety control system (SACM) 220-E, and a global positioning system (GPS) 220-F. As depicted, the controllers 220 are represented as discrete controllers and systems. However, the controllers 220 may share physical hardware, firmware, and/or software, such that the functionality from multiple controllers 220 may be integrated into a single controller 220, and that the functionality of various such controllers 220 may be distributed across a plurality of controllers 220.

The BCM 220-A may be configured to support various functions of the vehicle 102 related to control of current loads feeding off the vehicle 102 battery. Examples of such current loads include, but are not limited to, exterior lighting, interior lighting, heated seats, heated windshield, heated backlight, and heated mirrors. Additionally, the BCM 220-A may be configured to manage vehicle 102 access functions, such as keyless entry, remote start, and point of access status verification (e.g., closure status of the hood, doors and/or trunk of the vehicle 102).

The EBCM 220-B may be configured to control braking functions of the vehicle 102. In some examples, the EBCM 220-B may be configured to receive signal information from vehicle wheel sensors and/or drivetrain differentials, and manage anti-lock and anti-skid brake functions through control of brake line valves that adjust brake pressure from the master cylinder.

The SCM 220-C may be configured to aid in vehicle steering by augmenting or counter-acting steering effort provided to the vehicle 102 wheels. In some cases, the augmented steering effort may be provided by a hydraulic steering assist configured to provide controlled energy to the steering mechanism, while in other cases the augmented steering effort may be provided by an electric actuator system.

The PCM 220-D may be configured to perform engine control and transmission control functions for the vehicle 102. With respect to engine control, the PCM 220-D may be configured to receive throttle input and control actuators of the vehicle engine to set air/fuel mixture, ignition timing, idle speed, valve timing, and other engine parameters to ensure optimal engine performance and power generation.

With respect to transmission control, the PCM 220-D may be configured to receive inputs from vehicle sensors such as wheel speed sensors, vehicle speed sensors, throttle position, transmission fluid temperature, and determine how and when to change gears in the vehicle 102 to ensure adequate performance, fuel economy, and shift quality. The PCM 220-D may further provide information over the in-vehicle networks 218, such as vehicle speed and engine RPM.

The SACM 220-E may be configured to provide various functions to improve the stability and control of the vehicle 102. As some examples, the SACM 220-E may be configured to monitor vehicle sensors (e.g., steering wheel angle sensors, yaw rate sensors, lateral acceleration sensors, wheel speed sensors, etc.), and control the BCM 220-A, SCM 220-C, and/or PCM 220-D. As some possibilities, the SACM 220-E may be configured to provide throttle input adjustments, steering angle adjustments, brake modulation, and all-wheel-drive power split decision-making over the in-vehicle network 218 to improve vehicle stability and controllability. It should be noted that in some cases, the commands provided by the SACM 220-E may override other command input. The GPS 220-F is configured to provide vehicle 102 current location and heading information for use in vehicle 102 services.

An update scheduler application 222 may be an application installed to the memory of the telematics controller 202. When executed by the processor 204, the update scheduler application 222 may cause the telematics controller 202 to receive manifests 112 from the update server 108, prompt the user to install software updates 110 specified by the manifests 112 (e.g., using the display screen 216), receive user selections 116 whether or not to perform the installation (e.g., via the HMI controls 214), and if approved, download the software updates 110 specified by the manifest 112 from the update server 108 for installation to the ECUs 220 of the vehicle 102 (e.g., via the modem 208). The update scheduler application 222 may further provide the user selections 116 including contextual information to the update server 108 (e.g., the contextual information being received from the GPS 220-F or other controllers 220 of the vehicle 102 over the in-vehicle networks 218).

Figure 3:
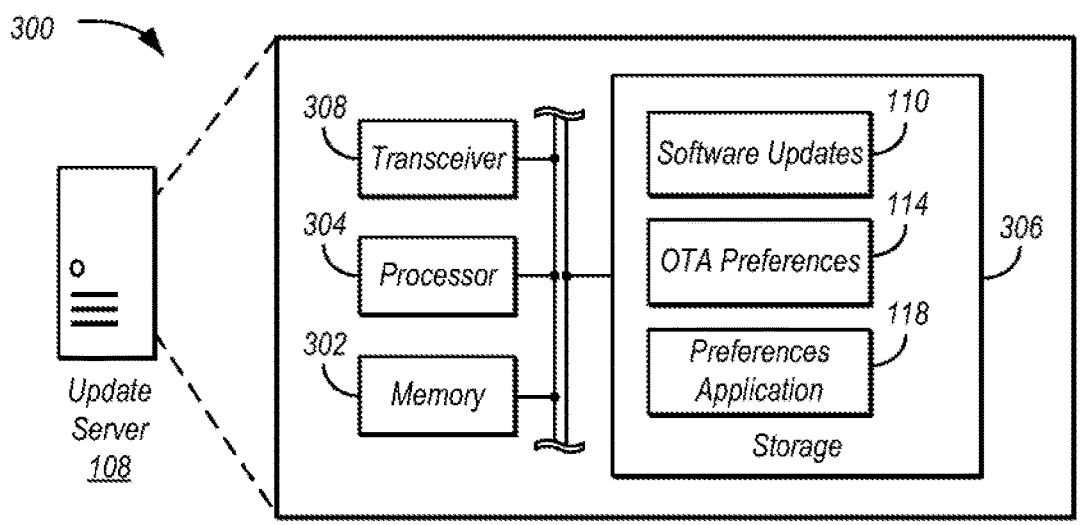
FIG. 3 illustrates an example diagram of the update server implementing machine learning facilities for use in determining OTA preferences.

FIG. 3 illustrates an example diagram 300 of the update server 108 implementing machine learning facilities for use in determining OTA preferences. The update server 108 may include and/or communicate with various types of computing apparatus to facilitate the performance of the update server 108 functions. As shown, the update server 108 includes one or more memories 302 and processors 304 configured to execute computer instructions, and a storage medium 306 on which the computer-executable instructions and/or data may be maintained.

The update server 108 also includes a transceiver 308 to allow the update server 108 to communicate over the wide-area network 104 with other devices. The transceiver 308 may include, for example, a modem device. For instance, the transceiver 308 may facilitate communication with the modem 208 of the vehicle 102 and/or with the mobile devices 210.

The software updates 110 and OTA preferences 114 may be stored to one or more storages 306 of the update server 108. The software updates 110 may be categorized in the storage 306 according to importance. In one example, the updates may be categorized as one of critical, medium, and low importance.

As mentioned above, the preferences application 118 may be an application installed to the storage 306 of the update server 108. When executed by the update server 108, the preferences application 118 may be configured to receive information indicative of user selections 116 whether or not to install software updates 110 to a vehicle 102. The user selections 116 may further include contextual information regarding the selections, such as location, day, and time of the selection.

Utilizing the user selections 116, the preferences application 118 may update the OTA preferences 114 to better indicate when a user should be prompted to perform software updates 110. In one example, the preferences application 118 may utilize the location information to identify locations that are frequented by the vehicle 102 (or vehicles 102).

Regarding the computation of frequent locations, in one example Evolving Clustering based Models (ECMs) may be used to learn frequent destinations, routes, and travel times. In Table 1, a summary of context is provided that may be beneficial to be taken into account for the learning of a user preference to accept or reject an OTA update:

TABLE 1

Trip Context for Predictive Modeling

| INPUT | DESCRIPTION |
| --- | --- |
| DATE | Date information such as presence of a holiday may be relevant in clustering data. |
| TIME | The time of day is a factor in predictive modeling and may be grouped into time bins with configurable duration. |
| DAY OF THE WEEK | Day of the week is a factor in predictive modeling. |
| DRIVER (PAIRED PHONE) | Each driver may have different, recognizable driving pattern. |
| PRIMARY ROUTE | The predictive model can have the most reliable and granular information for the routes most often taken and can prioritize cached data for the primary routes. |
| LOCATION | The current location of the vehicle along a route. |
| DESTINATION | The destination of the vehicle along a route. |
| ALTERNATIVE ROUTES | For secondary, tertiary, and any less likely routes, the vehicle can keep varying levels of details so as to have less impact on storage constraints |
| TRAFFIC | Traffic may change the route taken by a driver so this can help the modeling determine the most likely route and plan accordingly |
| PATTERN RECOGNITION | Daily commutes, frequent destinations, Drive times |
| USER CALENDAR | The system could interact with the driver's calendar to be able to predict based on known appointments or events whether the driver will take the common route or deviate. |
| USER CONNECTIVITY SETTINGS | Connectivity settings in the vehicle will affect whether or not the vehicle can communicate with the cloud and will affect OTA events |
| USER RESPONSE TO PROMPTS | The way a user responds to OTA prompts on the HMI can affect how the predictive model prioritizes or automates certain steps in the OTA process. |

For each identified frequent location, the preferences application 118 may further learn an OTA acceptance tendency value of the OTA preferences 114 according to time of day and day of week. In one illustrative example, the OTA acceptance tendency values may be specified in a range between 0 and 1, where 1 indicates a prompt is most likely to be provided, and 0 indicates a prompt is least likely to be provided.

In one example, the preferences application 118 may initialize the acceptance tendency value for a location and day/time to a predefined configurable value (e.g., 0.9) regardless of software update 110 importance.

If the user selections 116 indicate that the user has selected "update all" at the location, the preferences application 118 may increment the value for that location by a calibratable value (e.g., 0.3 in one example or another relatively larger value). If the user selections 116 indicate that the user has selected "do not update all" the preferences application 118 may decrement the value for that location by a calibratable value (e.g., 0.3 or another relatively larger value). If the user selections 116 indicate that the user has selected to perform a medium or low importance update, the preferences application 118 may increment the value for that location by a smaller calibratable value (e.g., 0.1 in one example or another relatively smaller value). If the user selections 116 indicate that the user has selected not to perform a medium or low importance update, the preferences application 118 may decrement the value for that location by a smaller calibratable value (e.g., 0.1 in one example or another relatively smaller value). The preferences application 118 may also clip the learned OTA acceptance tendency value to be within the range for the value (e.g., between 0-1 in the example being discussed). These updated OTA acceptance tendency values may be stored by the preferences application 118 to the OTA preferences 114.

The preferences application 118 may also set OTA importance scores (e.g., 1 for high importance updates, 0.5 for medium importance updates, and 0.2 for low importance updates). These scores may be used in combination with the OTA acceptance tendency value corresponding to the day/time and location of the vehicle 102 to determine whether to prompt the user to install software updates 110 indicated by a manifest 112. In one example for a given OTA importance score K, and a user's preference on a specific day, time and location P(d, t, loc), the user may be prompted to perform the update according to the condition where P(d, t, loc)>=(1−K).

As a variation on the operation of the preferences application 118, the importance score of the software update 110 may be taken into account during the learning process. For instance, the preferences application 118 may initialize the acceptance tendency value for a location and day/time to various predefined configurable values that vary according to the importance score of the software update 110 (e.g., 1 for high importance updates, 0.5 for medium importance updates, and 0.2 for low importance updates).

As another variation on the operation of the preferences application 118, in situations where day, time and/or location is unavailable or if the preferences application 118 is designed to operate based on an average preference of the user, an overall preference value K may be obtained as a weighted average of preference values that are day, time, and location specific. Regarding a default value for user preference, the default value may be set as an average preference of the user (e.g., inhibit some less important updates) or a value that will prompt all updates (e.g., 0). The specific default value to apply may reflect a design philosophy of the program, for instance, whether to be more adaptive to the user or to put more emphasis on delivery of needed updates.

Figure 4:
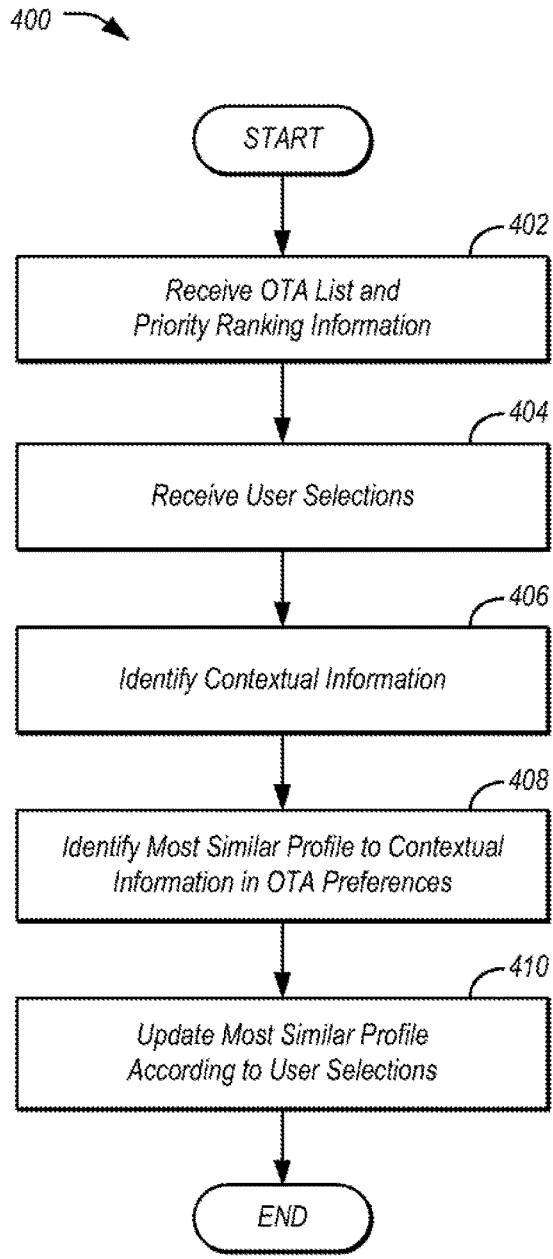
FIG. 4 illustrates an example process for learning OTA importance scores.

FIG. 4 illustrates an example process 400 for learning OTA importance scores. In an example, the process 400 may be performed by the preferences application 118 installed to the storage 306 of the update server 108. It should be noted that in other examples, the functionality of the preferences application 118 may be performed in whole or in part by other components. For instance, some or all of the functionality of the preferences application 118 may be performed by the telematics controller 202 of the vehicle 102 and/or by another server device in communication with the vehicle 102 and/or update server 108 over the wide-area network 104.

At operation 402, the preferences application 118 receives a listing of software updates 110 to be installed to a vehicle 102, along with priority information for the software updates 110 to be installed.

At 404, the preferences application 118 receives user selections 116. In an example, the user selections 116 may be sent from vehicles 102 responsive to user input in the vehicles 102 from users indicating whether or not to install software updates 110.

The preferences application 118 receives contextual information regarding the user selections 116 at 406. The contextual information may include factors such as location, day, and time of the user selections 116. In an example, the contextual information may be received from the vehicle 102 along with the user selections 116. In another example, the contextual information may be separately received from the vehicles 102 (e.g., responsive to querying of the vehicles 102 for the contextual information). In yet a further example, one or more aspects of contextual information may be determined or inferred by the preferences application 118 based on receipt of the user selections 116. For example, day and time information may be determined as the time of receipt of the user selections 116 from the vehicles 102. Or, location information may be inferred based on the origination network address of the user selections 116 received from the vehicles 102.

At 408, the preferences application 118 identifies a most similar profile in the OTA preferences 114. In an example, the preferences application 118 accesses the stored OTA preferences 114 to identify the OTA importance score K on the specific day, time, and location P(d, t, loc) corresponding to the user selections 116.

At operation 410, the preferences application 118 updates the identified most similar profile in the OTA preferences 114 according to the user selections 116. In an example, the preferences application 118 updates the OTA importance score K as discussed above with respect to FIG. 3. After operation 410, the process 400 ends.

Figure 5:
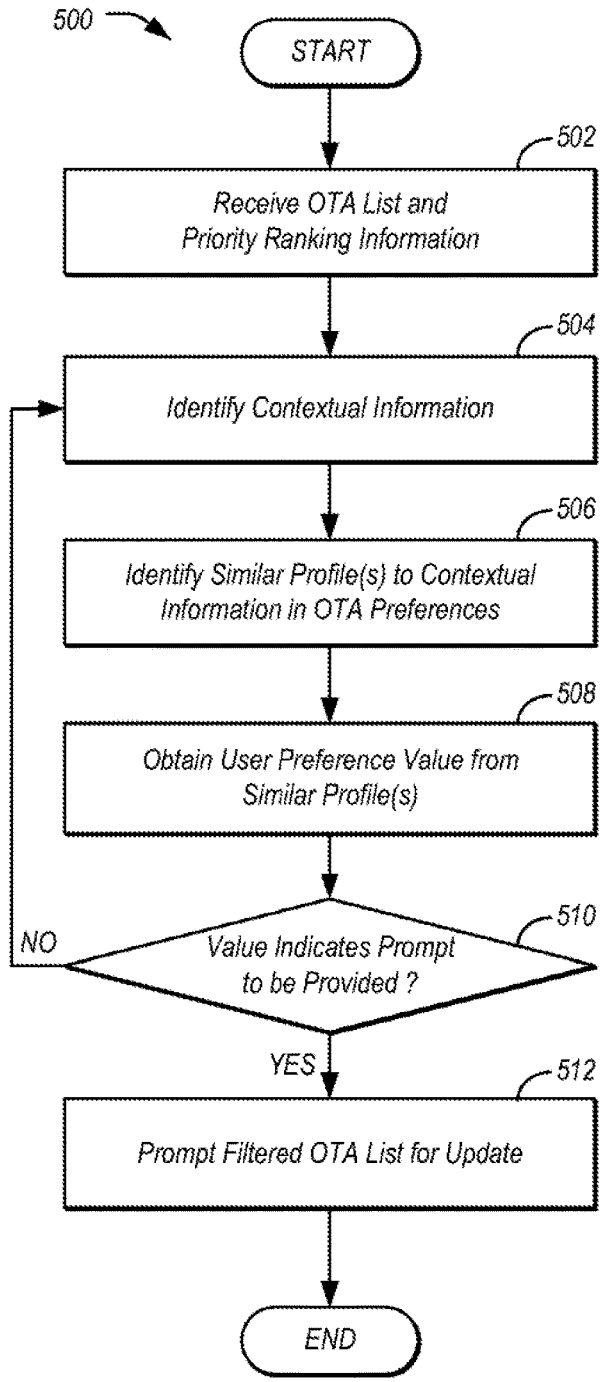
FIG. 5 illustrates an example process for utilizing OTA importance scores to filter software for installation to vehicles.

FIG. 5 illustrates an example process 500 for utilizing OTA importance scores to filter software updates 110 for installation to vehicles 102. In an example, the process 500 may be performed by the update scheduler 222 installed to the storage 206 of the telematics controller 202 of the vehicle 102. However, and similar to as discussed with regard to the process 400, in other examples the functionality of the update scheduler 222 may be performed in whole or in part by other components. For instance, some or all of the functionality of the update scheduler 222 may be performed by other controllers 220 of the vehicle 102, by the preferences application 118 of the update server 108 and/or by another server device in communication with the vehicle 102 over the wide-area network 104.

At operation 502, the update scheduler 222 receives a listing of software updates 110 to be installed to a vehicle 102, along with priority information for the software updates 110 to be installed. In an example, the update scheduler 222 may receive a manifest 112 specifying the listing of software updates 110 to be installed from the update server 108.

The update scheduler 222 identifies contextual information regarding the user selections 116 at 504. In an example, one or more aspects of contextual information may be determined or inferred by the update scheduler 222 based on information available within the vehicle 102. For example, day and time information may be determined as a current day and time as tracked by the telematics controller 202 or by one or more other controllers 220 of the vehicle 102. Location information may be identified by communication over the in-vehicle networks 218 with the GPS controller 220-F.

At operation 506, the update scheduler 222 identifies similar profiles to the contextual information identified at operation 504. In an example, the update scheduler 222 may utilize the modem 208 to query the update server 108 for profiles that match the contextual information. Responsive to the query, the update server 108 may send one or more OTA importance scores K that relate to the contextual information (e.g., a specific day, time, and location P(d, t, loc)).

At 508, the update scheduler 222 obtains a user preference value from the similar profiles. In one example, the update scheduler 222 averages the received OTA importance scores K to determine an overall OTA importance score K. In another example, the update scheduler 222 weights overall OTA importance scores K that are more specific (e.g., for a smaller area or shorter timeframe) greater in the averaging than OTA importance scores K that are more generic (e.g., for a larger area or longer timeframe). In yet a further example, the operations performed at 508 are completed by the update server 108, such that the update server 108 returns a single overall OTA importance score K at operation 506.

At operation 510, the update scheduler 222 determines whether to provide a prompt to the user based on the user preference value and the priorities of the software updates 110 of the OTA list. In one example, based on the OTA importance score K for the software updates 110 of the OTA list and the user preference value P(d, t, loc)) obtained at operation 508, the user may be prompted to perform the update according to the condition where P(d, t, loc)>=(1−K). If the condition is met, control passes to operation 512. Otherwise, no prompt is provided and the process returns to operation 504 to evaluate contextual information at a later time, day, and/or location.

The update scheduler 222 prompts the user for installation of the software updates 110 at 512. If the user chooses in the affirmative, then the update scheduler 222 proceeds to schedule the installation of the software updates 110. If the user chooses the negative, then the update scheduler 222 does not schedule the installation of the software updates 110. Regardless of which choice is given, the user selection 116 may be provided to the preferences application 118 (e.g., according to the process 400 described above). After operation 512, the process 500 ends.

Accordingly, the described systems and methods prompt the user to perform OTA updates with content that the user is likely to accept given current context (e.g., day, time and location). Additionally, the systems and methods may mitigate situations when prompting for an update is constantly rejected by the user, while also not affecting the prompting for installation of high importance or other critical updates. Yet further, the described systems may communicate with the user the reason why a previously rejected item is being brought up again (e.g., that the items is related or is a pre-requisite for another more critical item).

In general, computing systems and/or devices, such as telematics controller 202, controllers 220, and update server 108, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the telematics controller 202, controllers 220, and update server 108, generally include computer-executable instructions that may be executable by one or more processors of the computing devices. Computer-executable instructions may be compiled or interpreted from computer programs created using a variety of programming languages and/or technologies, including, without limitation, and either alone or in combination, JAVA™, C, C++, VISUAL BASIC, JAVASCRIPT, PERL, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the telematics controller 202, controllers 220, and update server 108 may be such computer program products (e.g., the update scheduler 222, the preferences application 118). In some examples, these computer program products may be provided as software that when executed by one or more processors provides the operations described herein. Alternatively, the computer program products may be provided as hardware or firmware, or combinations of software, hardware, and/or firmware.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A vehicle comprising:
   a controller; and
   a processor programmed to:
      receive a first manifest from an update server,
      prompt a user to install software updates specified by the first manifest,
      receive user selections of whether or not to install the software updates,
      send the user selections of whether or not to install the software updates, including contextual information, to the update server, to cause the update server to determine a user preference value indicative of a user acceptance tendency for software updates, the user preference value being determined using a machine learning system trained by observing historically how users decide to accept or reject software updates in view of the contextual information, the contextual information including time, user, and route information corresponding to the user selections of whether or not to install the software updates,
      receive the user preference value from the update server,
      prompt for a selection of whether or not to install a controller software update to the controller responsive to the user preference value exceeding a predefined threshold defined by a priority of the controller software update, the user preference value being computed from historical selections of whether or not to install software updates that correspond to contextual information that matches current contextual information for the controller software update to be installed, and
      send the user selections of whether or not to install the software updates, including the contextual information, to the update server, to cause the update server to further update the user preference value per the selection of whether or not to install the controller software update to the controller.

2. The vehicle of claim 1, wherein the contextual information includes time, day, and vehicle location.

3. The vehicle of claim 1, wherein the user preference value is an average of user preference values for a plurality of profiles matching the contextual information.

4. The vehicle of claim 1, wherein the priority of the controller software update includes one of a low priority defining a first threshold value, a medium priority defining a second threshold value lower than the first threshold value, or a high priority defining a third threshold value lower than the second threshold value.

5. The vehicle of claim 1, wherein the processor is further programmed to receive a second manifest from the update server specifying a plurality of software updates to be installed, the controller software update being included in the second manifest.

6. A method comprising:
   receiving a first manifest from an update server to a vehicle;
   prompting a user to install software updates specified by the first manifest;
   receiving user selections of whether or not to install the software updates to the vehicle;
   sending the user selections of whether or not to install the software updates to the vehicle, including contextual information, to the update server, to cause the update server to determine a user preference value indicative of a user acceptance tendency for software updates, the user preference value being determined using a machine learning system trained by observing historically how users decide to accept or reject software updates in view of the contextual information, the contextual information including time, user, and route information corresponding to the user selections of whether or not to install the software updates to the vehicle;

receiving the user preference value from the update server;

prompting for a response to install a further software update to the vehicle responsive to the user preference value exceeding a threshold defined by a priority of the further software update;

installing the further software update when the response affirms installation; and sending the response to the update server to further train the user preference value.

7. The method of claim 6, further comprising computing the user preference value as an average of user preference values for a plurality of profiles matching the contextual information.

8. The method of claim 6, wherein the priority of the further software update includes one of a low priority defining a first threshold value, a medium priority defining a second threshold value lower than the first threshold value, or a high priority defining a third threshold value lower than the second threshold value.

9. The method of claim 6, further comprising receiving a second manifest from the update server specifying a plurality of software updates to be installed, the further software update being included in the second manifest.

10. The method of claim 6, further comprising prompting for the response using a display screen of the vehicle.

11. The method of claim 6, further comprising receiving the response using human-machine input (HMI) controls of the vehicle.

12. A system comprising:
a memory storing a plurality of user preference values; and
a processor programmed to:
receive user selections indicative of whether or not users chose to install software updates to vehicles, the user selections including contextual information regarding conditions surrounding a decision of whether or not to perform the installation of the software updates to the vehicles, the contextual information including at least two of time, user, or route information corresponding to the user selections of whether or not to install the software updates to the vehicles;

determine a user preference value indicative of a user acceptance tendency for software updates, the user preference value being determined using a machine learning system trained by observing historically how users decide to accept or reject software updates in view of the contextual information;

send, to a vehicle, the user preference value matching contextual information received in a request from the vehicle, the vehicle using the user preference value and a priority of a software update to determine whether to prompt a user to install the software update;

receive a selection from the vehicle in response to the prompt; and further update the user preference value according to the selection using the machine learning system.

13. The system of claim 12, wherein the contextual information includes time, day, and vehicle location.

14. The system of claim 12, wherein the user preference value is an average of user preference values for a plurality of profiles matching the contextual information.

15. The system of claim 12, wherein the processor is further programmed to send, to the vehicle, a manifest specifying a plurality of software updates to be installed, the software update being included in the manifest.

16. The system of claim 12, wherein the processor is further programmed to determine the user preference value by operations including:
responsive to receiving a user selection indicating that the user has selected to apply all software updates at a location, increment a user preference value for the location by a first value, responsive to receiving a user selection indicating that the user has selected not to apply all software updates at the location, decrement the user preference value for the location by the first value, responsive to receiving a user selection indicating that the user has selected to install a single software update, increment the user preference value for the location by a second value, the second value being smaller than the first value, responsive to receiving a user selection indicating that the user has selected not to install a single software update, increment the user preference value for the location by the second value, and responsive to the increment or decrement operations, clip the user preference value to be within a predefined value range.

17. The system of claim 16, wherein the processor is further programmed to set importance scores to predefined thresholds, and wherein, for a given importance score and a user preference value for current contextual information, the importance scores are configured to cause the user to be prompted to install the single software update responsive to the user preference value exceeding the given importance score.

18. The system of claim 16, wherein the processor is further programmed to initialize the user preference value to a predefined value corresponding to a priority of a software update to be installed.

19. The system of claim 16, wherein the processor is further programmed to initialize the user preference value to an importance score corresponding to a priority of a software update to be installed.

20. The system of claim 12, wherein the processor is further programmed to:
determine an overall preference value for a user as a weighted average of preference values for the user across contextual information; and utilize the weighted average of preference values for the user as a default value for the user preference value for the user.

* * * * *